United States Patent
Reynard et al.

[11] 3,883,451
[45] May 13, 1975

[54] FLAME-RETARDANT POLY (ARYLOXYPHOSPHAZENE) COPOLYMERS

[75] Inventors: Kennard A. Reynard, Mentor; Selwyn H. Rose, Beachwood, both of Ohio

[73] Assignee: Horizons Incorporated, Cleveland, Ohio

[22] Filed: June 11, 1973

[21] Appl. No.: 368,848

[52] U.S. Cl. ......... 260/2 P; 260/2.5 R; 260/30.4 R; 260/30.4 N; 260/47 R
[51] Int. Cl. ...................... C08g 33/16; C08g 33/02
[58] Field of Search ...................... 260/2 P

[56] References Cited
UNITED STATES PATENTS
3,370,020  2/1968  Allcock et al. .................. 260/2 P
3,627,841  12/1971  Kober et al. .................. 260/2 P
3,702,833  11/1972  Rose et al. .................. 260/2 P

*Primary Examiner*—Wilbert J. Briggs, Sr.
*Attorney, Agent, or Firm*—Lawrence I. Field

[57] ABSTRACT

Poly(aryloxyphosphazene) copolymers which consist of the units which occur in a nonregular fashion and are represented by the following general formulas:

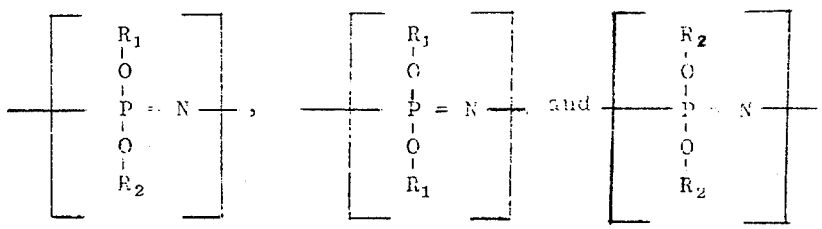

wherein $R_1$ and $R_2$ each represents an aryl or substituted aryl radical, $R_1$ and $R_2$ being different, and $R_2$ being substituted with at least one halogen (chlorine or bromine), the polymers possessing excellent flame retardancy, and improved processability as compared with prior art aryloxyphosphazene homopolymers are described.

10 Claims, No Drawings

FLAME-RETARDANT POLY(ARYLOXYPHOSPHAZENE) COPOLYMERS

This invention relates to inexpensive, completely substituted poly(aryloxyphosphazene) copolymers which exhibit a combination of useful solubility, high tractability, and excellent flame-retardant properties. These novel materials exhibit greater solubility in organic solvents and greater processability into useful shapeable compositions than completely substituted poly(aryloxyphosphazene) homopolymers which have been described in the past. These copolymers are further characterized by the presence of aryl halogen, the absence of P—Cl sites and good hydrolytic stability.

The polymers of this invention are soluble plastics that can be rendered easily into a variety of forms such as films, fibers, foams, solid shaped articles and structural composites. In such forms they are useful as fire-retardant materials such as tiles, wire covering, fabrics, paints, insulation, carpet backing and the like.

The simultaneous presence of phosphorus, nitrogen and halogen imparts a high order of flame retardancy and further increases the utility of the polymers of this invention in these applications. Flame-retardant materials are defined as materials which as molded specimens (6 × ¼ × ⅛ inches) have a Limiting Oxygen Index (LOI) (ASTM D-2863) of 27 or greater.

The structure of the poly(aryloxyphosphazenes) of this invention is composed of monomer units shown below, and the monomer units occur in nonregular sequences along the polymer chain.

mers depends on the quantity and/or position of the halogen substituent(s) as shown in Table I below.

TABLE I

Mole Percentages of $R_2$ Group in Poly(aryloxyphosphazene) Copolymers

| $R_2=$ | Maximum Mole % |
| --- | --- |
| 3- or 4- halophenyl | 95 |
| 2-chlorophenyl | 85 |
| 2,4-chloro or 3,4-dihalophenyl | 70 |
| 2,6-dichlorophenyl | 50 |
| 2,4,5- or 2,4,6-$Cl_3C_6H_2$- | 50 |
| 2,3,4,6-$Cl_4C_6H$- or $C_6Cl_5$- | 30 |

*halo includes chloro- and bromo-

The incorporation of aryloxy- substituents with groups in the 2- or 6- positions onto the phosphorus-nitrogen backbone is significant. The preparation of completely substituted aryloxy-phosphazene homopolymers (low P—Cl content) which contain ortho substituents is extremely difficult, but the introduction of large quantities of these side chains can be accomplished through copolymerization. In many cases, ortho substituted phenols are less expensive than isomers.

The decrease in maximum mole percent of different $R_2$ substituents is related approximately to the number and location of halogens on the phenyl ring. The $R_2$ group will decrease approximately 15 mole percent for each additional halogen in $R_2$ plus an additional 15 mole percent for each ortho position that is occupied by halogen in $R_2$.

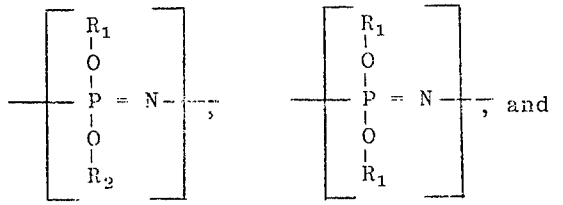 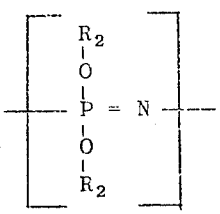

For the sake of simplicity, the formula for copolymers which contain these three units is written as $[(R_1O)_2PN—(R_2O)_2PN]_n$. The $R_1$ group is selected from phenyl, 3- or 4- substituted phenyl; 3,4- or 3,5- disubstituted phenyl and 3,4,5- trisubstituted phenyl, where the substituents are chosen from alkyl (1–5 carbon atoms), alkoxy (1–4 carbon atoms), phenyl, phenoxy, chlorine and bromine such that no more than one halogen is present on the phenyl ring; where $R_2$ is selected from $XC_6H_4$—, $X_2C_6H_3$—, 2,4,5—$Cl_3C_6H_2$—, 2,4,6—$Cl_3C_6H_2$—, 2,3,4,6—$Cl_4C_6H$—, and $C_6Cl_5$— where X is Cl or Br, but Br can only occupy the 3,4 or 5 position, and $R_1 \neq R_2$, and the value of $n$ is between 20 and 50,000. The ratio of $R_1$ to $R_2$ groups in the polymer is from about 95/5 to about 5/95 depending on $R_1$ and $R_2$.

The ratio of $R_1/R_2$ groups and the nature of the $R_1$ and $R_2$ groups affect the solubility, moldability and/or flame retardancy. An increase in the halogen content or the mole % of the $R_2$ group increases flame retardancy at the expense of solubility and processability, whereas an increase in the number of or the length of the alkyl or alkoxy group(s) on the phenoxy ring of the $R_1$ group increases solubility but decreases flame retardancy. The approximate maximum amount of $R_2$ group that will afford soluble and processable copoly- Closely related prior art is given in U.S. Pat. No. 3,370,020, Inorg. Chem., 5, 1709 (1966) and Polymer, 11, 31, (1970). Other prior art of interest may be found in U.S. Pat. No. 3,515,688, U.S. Pat. No. 3,700,629, and Polymer, 13, 253 (1972). Low molecular weight liquids which contain some of the substituents of this invention are claimed in U.S. Pat. No. 3,505,087. However, the copolymers disclosed herein are high molecular weight plastics.

The copolymers of this invention, such as $[(C_6H_5O)_2PN—(2,4—Cl_2C_6H_3O)_2PN]_n$ and $[(4—ClC_6H_4O)_2PN—(2,4—Cl_2C_6H_3O)_2PN]_n$, are plastics and are readily soluble in cold tetrahydrofuran. Ten percent solutions are easily prepared in tetrahydrofuran at 25°C. The $[(C_6H_5O)_2PN]_n$ and $[(4—ClC_6H_4O)_2PN]_n$ homopolymers of comparable molecular weights exhibit much lower solubility than the comparable copolymers of the present invention.

The processability of the copolymers of this invention generally is improved over many homopolymers described in the prior art. For example, the $[(C_6H_5O)_2PN]_n$, $[(4—ClC_6H_4O)_2PN]_n$, and $[(2,4—Cl_2C_6H_3O)_2PN]_n$ homopolymers produce brittle specimens when molded at 150°C and 20,000 lbs/in². In contrast, the $[(C_6H_5O)_2PN—(4—ClC_6H_4O)_2PN]_n$,

[($C_6H_5O)_2PN$—$(2,4$—$Cl_2C_6H_3O)_2PN]_n$, and [$(4$—$ClC_6H_4O)_2PN$—$(2,4$—$Cl_2C_6H_3O)_2PN]_n$ copolymers are easily molded under these same conditions. Generally as the amount of halogen content in the copolymers of this invention increases, the tractability decreases.

The process for the preparation of the copolymers of this invention herein disclosed is now described. Poly(dichlorophosphazene) is dissolved in a suitable solvent such as benzene, toluene, xylene, chlorobenzene, dichlorobenzene, tetrahydrofuran or mixtures thereof. To this well stirred polymer solution is gradually added a solution or suspension of the less reactive aryloxide salt. Sodium salts are normally employed but lithium or potassium salts are also suitable. The mole percent of salt can vary over the range 5–95% based on equivalents of chlorine present in the poly(dichlorophosphazene). The reaction temperature will generally be in the range of from below room temperature to 200°C, but is preferably in the range 20° to 160°C.

When this reaction is essentially complete, as evidenced by a drop in pH to about 7, the next aryloxide salt is added. The reaction temperature for the second reaction step can vary from about room temperature to about 200°C, but is preferably between 120°–160°C. The upper temperature limit is determined by the reactivity of the salt and polymer solubility. Alkali salts derived from phenol, 3-chlorophenol, 4-chlorophenol, 3-methylphenol, 4-methylphenol, 4-bromophenol, or 4-chloro-3-methylphenol are more reactive than aryloxides from 2-chlorophenol or more highly halogenated phenols such as 3,4-dichlorophenol, 2,4-dichlorophenol, 3,4-dibromophenol, and 2,4,5- or 2,4,6-trichlorophenol, 2,3,4,6-tetrachlorophenol and pentachlorophenol. Other phenols which may be used in the practice of this invention are 3- or 4-ethylphenol, 3- or 4-methoxyphenol, 3,5- or 3,4-dimethylphenol, 4-phenylphenol, 4-phenoxyphenol, and 4-amylphenol. Temperatures in excess of 100°C and reaction times of 20 to 150 hours are necessary to completely react the phosphorus-chlorine sites on the polymer. The phosphazene copolymers so produced may be isolated by conventional methods.

This method for the preparation of the copolymers of this invention afforded materials which were free of P—Cl sites, but the addition of a solution of poly(dichlorophosphazene) to a mixture of sodium aryloxides also can be used to prepare polymers which are both soluble and highly flame retardant. In fact, copolymers derived from the more reactive sodium salts of phenol, 3-chlorophenol, 4-bromophenol, and 4-chlorophenol appeared the same regardless of which mode of addition is employed.

Preparation of aryloxyphosphazene copolymers of this invention is illustrated by the following examples which are not intended to limit the scope of the invention.

EXAMPLE

[$(4$—$ClC_6H_4O)_2PN$—$(2,4$-$Cl_2C_6H_3O)_2PN]_n$ (1:1)

Sodium 2,4-dichlorophenoxide prepared from 2,4-dichlorophenol (90.2 g, 0.553 mole), and sodium (11.8 g, 0.518 mole) in 350 ml of bis (2-ethoxyethyl)ether was added hot (ca. 70°C) over ¼ hour to a room temperature solution of [$Cl_2PN]_n$ polymer (58.1 g, 1.01 equivs.) in 750 ml of toluene. This solution was heated to 105°C, bis(2-ethoxyether)ether (200 ml) was added and after one hour the pH was about 7. A warm 4-chlorophenoxide solution, which was prepared from 4-chlorophenol (71.1 g, 0.553 mole), and sodium (11.8 g, 0.518 mole) in 350 ml of bis(2-ethoxyethyl)ether, was added over ¼ hour to the polymer mixture at 105°–110°C. The mixture was refluxed (130°C) for 22 hours. The copolymer precipitated when the solution cooled and was filtered from the liquor. The copolymer was air dried, washed overnight with 4 liters of methanol-water (1v/1v), taken up into 2 liters of sym-tetrachloroethane, and water washed. Precipitation into methanol afforded a white, fibrous copolymer (120.7 g, 72% yield). The copolymer was soluble in tetrahydrofuran, dioxane, hot tetrachloroethylene and hot sym-tetrachloroethane but was insoluble in common solvents such as benzene, acetone, ethanonl, petroleum ether. Films cast from tetrahydrofuran solution were flexible, strong and showed moderate orientation upon drawing. Fibers could also be prepared from solution. The intrinsic viscosity in tetrahydrofuran was 2.3 dl/g at 30°C and the Limiting Oxygen Index was 59. Samples were molded easily at 150°C and 20,000 lbs/in². Anal. Calcd. for 1:1 copolymer of [$(ClC_6H_4O)_2PN$-$(Cl_2C_6H_3O)_2PN]_n$: C, 43.0; H, 2.1; Cl, 31.8. Found: C, 42.8; H, 2,5; Cl, 31.8.

EXAMPLE 2

[$(C_6H_5O)_2PN$—$(2,4$—$Cl_2C_6H_3O)_2PN]_n$ (1:1)

Following the procedure of Example 1, this copolymer was prepared by reaction of sodium 2,4-dichlorophenoxide prepared from 2,4-dichlorophenol (208.0 g, 1.27 moles) and sodium (27.8 g, 1.21 moles) in 1 liter of bis(2-methoxyethyl)ether with a solution of [$Cl_2PN]_n$ polymer (138.0 g, 2.38 equivs.) in 800 ml of benzene. Upon completion of this reaction, a solution of sodium phenoxide prepared from phenol (123.8 g, 1.32 moles) and sodium (28.7 g, 1.26 moles) in 1 liter of bis(2-methoxyethyl)ether was added and the reaction completed by heating 150 hours at 130°C. The product (248.0 g, 69% yield) was a fine powdery plastic which had an intrinsic viscosity in tetrahydrofuran of 1.4 dl/g at 30°C. Films cast from tetrahydrofuran were very flexible and oriented upon drawing. The Limiting Oxygen Index was 43. Flexible plastic specimens were obtained by molding at 80°C and 20,000 lbs/in². Anal. Calcd. for [$(C_6H_5O)_2PN$—$(Cl_2C_6H_3O)_2PN]_n$: C, 48.9; H, 2.7; N, 4.7; Cl, 23.7. Found: C, 47.8; H, 2.8; N, 4.9; Cl, 24.5.

EXAMPLE 3

[$(2,4$—$Cl_2C_6H_3O)_2PN]_n$ (Comparative)

The [$(Cl_2PN]_n$ polymer (11.6 g, 0.20 equiv.) was dissolved in 170 ml of benzene and added over 20 minutes to a solution of sodium 2,4-dichlorophenoxide at 125°C. The aryloxide was prepared from 2,4-dichlorophenol (40.7 g, 0.25 mole) and sodium (5.3 g, 0.23 mole) in 150 ml of bis(2-ethoxyethyl)ether. Additional solvent (chlorobenzene, 225 ml) was added to the mixture which was heated for 27 hours at 147°C. Polymer was precipitated by addition of 1 liter of methanol and was washed exhaustively with methanol-water. The product (39.3 g, 100% yield) was a fine white powder, which was insoluble in all common solvents and melted at 255°–270°C. Anal. Calcd. for [$(Cl_2C_6H_3O)_2PN]_n$: C, 39.1; H, 1.6; Cl, 38.4. Found: C, 39.4; H, 1.7; Cl, 36.4. Extraction of the product with warm N,N-dimethylformamide (DMF) afforded about 10% of lower melting (190°C) powder with an intrinsic viscosity in DMF of 0.02 dl/g at 30°C. The elemental analysis of this soluble material was essentially identical to that of the original material.

This experiment was repeated and several experiments also were conducted at 123°C (46 hours). The products from all experiments were very similar to the materials described above in melting behavior, insolubility and poor elemental analysis.

EXAMPLE 4

[(3,4-Cl$_2$C$_6$H$_3$O)$_2$PN]$_n$ (Comparative)

The [Cl$_2$PN]$_n$ polymer (20.2 g, 0.35 equiv.) was dissolved in 0.093 liters of benzene/chlorobenzene (1v/1v) and added in 20 minutes to a solution (125°C) of sodium aryloxide which was prepared from 3,4-dichlorophenol (68.0 g, 0.417 mole), and sodium (8.8 g, 0.348 mole) in 240 ml of bis(2-ethoxyethyl)ether-dioxane (3v/1v). The reaction mixture was heated 16 hours at 125°C and 15 hours at 131°C. Polymer was precipitated by addition of 2 liters of methanol and purified by exhaustively washing with methanol-water. The product (37.0 g, 57% yield) was a fine, white powder which softened at 223°–233°C. The product was insoluble in all common solvents including N,N-dimethylformamide, dimethylsulfoxide and hexamethylphosphoramide. Anal. Calcd. for [(Cl$_2$C$_6$H$_3$O)$_2$PN]$_n$: C, 39.1; H, 1.6; N, 3.8; Cl, 38.4. Found: C, 37.9; H, 1.5; N, 3.7; Cl, 38.9.

EXAMPLES 5–26

Followiwng the procedure of Example 1, using the appropriate sodium aryloxides and reaction times of 20 to 50 hours at temperatures of 130° to 150°C, the copolymers of Examples 5 through 26 were prepared. Polymers were purified by precipitation with methanol, and exhaustive washing with methanol-water (1v/1v). The polymers were soluble and had LOI ratings of at least 32. Elemental analysis and proton NMR confirmed the structure based on initial charge of sodium aryloxides.

The copolymers described in Examples 5–26 were more soluble and processable relative to each other when the halogen content was low and/or when the carbon content was high. These materials may be molded at or below 150°
and at a pressure of 24,000 psi.

EXAMPLE 27

Preparation of [(C$_6$H$_5$O)$_2$PN]$_n$ (Comparative)

The [Cl$_2$PN]$_n$ polymer (900.0 g, 15.6 equivs.) was dissolved in 6.0 liters of dry benzene/chlorobenzene (7v/5v) and added in 5½ hours to a dried solution (125°C) of sodium phenoxide which was prepared from phenol (2115 g, 22.5 moles) and sodium (476.0 g, 20.7 moles) in 12.0 liters of bis(2-methoxyethyl)ether. The reaction mixture was heated 50 hours at 125°C. Polymer was precipitated by addition to 20.0 liters of methanol and purified by washing with 20.0 liters of methanol, exhaustively washed with distilled water and was slurried twice with 10.0 liter portions of methanol. The product (993.0 g, 55.4% yield) was a white fibrous solid which had an intrinsic viscosity of 1.5 dl/g in tetrahydrofuran at 30°C. Tough, flexible films were cast from tetrahydrofuran. Anal. Calcd. for [(C$_6$H$_5$O)$_2$PN]$_n$: C, 62.3; H, 4.3; N, 6.1; Cl, 0.0. Found: C, 62.3; H, 4.4; N, 6.0; Cl, <1 ppm. Attempts to mold the [(C$_6$H$_5$O)$_2$PN]$_n$ homopolymer at temperatures of 80°, 120°, 150° and 200°C at 24,000 psi pressure in all cases gave brittle specimens.

EXAMPLE 28

Preparation of [(4—ClC$_6$H$_4$O)$_2$PN]$_n$ (Comparative)

The [Cl$_2$PN]$_n$ polymer (100 g, 1.72 equivs.) was dissolved in 600 ml of benzene/toluene (3v/2v) and added to a solution (123°C) of sodium 4-chlorophenoxide which had been prepared from 4-chlorophenol (267 g, 2.08 moles) and sodium (42.7 g, 1.85 moles) in 1.3 liters of bis(2-ethoxyethyl)ether/dioxane (3v/1v). The mixture was maintained at 126°C for 26 hours, after which polymer was precipitated by addition of 1.3 liters of methanol. The polymer was slurried repeatedly with methanol/water (1v/1v) and was dissolved in 2 liters of tetrahydrofuran and reprecipitated by addition of 4 li-

|         | Sodium Salt Added Initially | | Sodium Salt Added Last | |
|---------|---------|------------------------|---------|------------------------|
| Example | mole(s) | Derived from           | mole(s) | Derived from           |
| 5       | 0.21    | 2,4-dichlorophenol     | 0.83    | phenol                 |
| 6       | 0.52    | 2,4-dichlorophenol     | 0.52    | phenol                 |
| 7       | 0.68    | 2,4-dichlorophenol     | 0.36    | phenol                 |
| 8       | 0.34    | 2,4-dichlorophenol     | 0.70    | 4-chlorophenol         |
| 9       | 0.63    | 2,4-dichlorophenol     | 0.41    | 4-chlorophenol         |
| 10      | 0.52    | 3,4-dichlorophenol     | 0.52    | 3-chlorophenol         |
| 11      | 0.11    | 2,4,5-trichlorophenol  | 0.93    | phenol                 |
| 12      | 0.52    | 2,4,5-trichlorophenol  | 0.52    | phenol                 |
| 13      | 0.41    | 2,4,5-trichlorophenol  | 0.63    | 4-chlorophenol         |
| 14      | 0.52    | 2-chlorophenol         | 0.52    | 4-chlorophenol         |
| 15      | 0.52    | 2,4-dichlorophenol     | 0.52    | 4-methylphenol         |
| 16      | 0.52    | 2,4-dichlorophenol     | 0.52    | 4-chloro-3-methylphenol |
| 17*     | 0.93    | 4-bromophenol          | 0.11    | phenol                 |
| 18      | 0.68    | 2,4-dichlorophenol     | 0.36    | 4-chloro-3,5-dimethylphenol |
| 19*     | 0.05    | 3-methoxyphenol        | 0.99    | 4-chlorophenol         |
| 20      | 0.25    | pentachlorophenol      | 0.80    | 4-ethylphenol          |
| 21*     | 0.98    | 4-chlorophenol         | 0.05    | phenol                 |
| 22*     | 0.85    | 4-bromophenol          | 0.18    | 3,5-dimethylphenol     |
| 23      | 0.42    | 2,4,6-trichlorophenol  | 0.62    | 4-phenoxyphenol        |
| 24      | 0.52    | 4-chlorophenol         | 0.52    | 4-phenylphenol         |
| 25      | 0.52    | 3,4-dibromophenol      | 0.52    | 4-n-amylphenol         |
| 26      | 0.41    | 2,3,4,6-tetrachlorophenol | 0.63 | phenol                 |

*Essentially the same copolymer was obtained by addition of a solution of [Cl$_2$PN]$_n$ polymer (1.01 equivs.) to a solution which contained the two sodium aryloxides and completion of the reaction at 130°C.

ters of water. The product (140 g, 54% yield) was a tough, white plastic and had an intrinsic viscosity in tetrahydrofuran of 1.8 dl/g at 30°C. The $T_g$ and $T_m$ were 5° and 141°C, respectively. Films cast from tetrahydrofuran were strong and flexible and oriented upon drawing. The product did not contain P—Cl sites and was unaffected by moisture at elevated temperatures. Anal. Calcd. for $[(ClC_6H_4O)_2PN]_n$: C, 48.0; H, 2.8; N, 4.7; Cl, 23.7. Found: C, 48.2; H, 2.9; N, 4.8; Cl, 23.5. Attempts to mold the homopolymer at temperatures of 80°, 120°, 150° and 200°C at 24,000 psi pressure in all cases gave brittle specimens.

We claim:

1. Poly(aryloxyphosphazene) copolymers consisting of 20 to 50,000 randomly repeating units represented by the following general formulas:

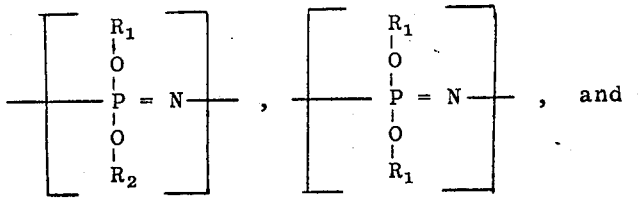 , 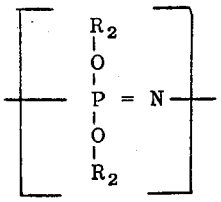 and wherein $R_1$ and $R_2$ are different monovalent aryl radicals, and $R_1$ is an aryl radical selected from the group consisting of phenyl, 3-substituted phenyl, 4-substituted phenyl, 3,4-disubstituted phenyl, 3,5-disubstituted phenyl and 3,4,5-trisubstituted phenyl, wherein the substituents are selected from the group consisting of lower alkyl, lower alkoxy, and halogen, but not more than one substituent may be halogen, and $R_2$ is $XC_6H_4$—, $X_2C_6H_3$—, $2,4,5-Cl_3C_6H_2$—, $2,4,6-Cl_3C_6H_2$—, $2,3,4,6-Cl_4C_6H$—, and $C_6Cl_5$— where X is Cl or Br, but Br can only occupy the 3,4 or 5 position; wherein the ratio of $R_1/R_2$ groups for 3- or 4- monosubstituted phenyl can vary from 95/5 to 5/95, and the $R_2$ group will decrease approximately 15 mole percent for each additional halogen in $R_2$ plus an additional an additional 15 mole percent for each ortho position that is occupied by halogen.

2. The copolymer of claim 1 wherein $R_2$ is a substituted phenyl group which contains at least the 4—Cl or 4—Br substituent.

3. The copolymer of claim 1 wherein $R_1$ is phenyl and $R_2$ is $2,4-Cl_2C_6H_3$—.

4. The copolymer of claim 1 wherein $R_1$ is $4-ClC_6H_4$— and $R_2$ is $2,4-Cl_2C_6H_3$—.

5. The copolymers of claim 1 in which $R_1$ is 3— or $4-CH_3C_6H_4$— and $R_2$ is $2,4-Cl_2C_6H_3$—.

6. The copolymer of claim 1 wherein $R_1$ is phenyl and $R_2$ is 3— or $4-QC_6H_4$—, and Q is Cl,Br or $CH_3$.

7. The copolymer of claim 1 wherein $R_1$ is phenyl and $R_2$ is $2,4,5-Cl_3C_6H_2$—.

8. The copolymer of claim 1 wherein $R_1$ is phenyl and $R_2$ is $Cl_5C_6$—.

9. A process where poly(dichlorophosphazene) and the alkali metal salts of phenol and a substituted phenol, or the salts of two substituted phenols are reacted at temperatures of below room temperature to 200°C.

10. Shaped compositions and films obtained from the polymers of claim 1.

* * * * *